3,264,063
PREPARATION OF ETA ALUMINA BY WATER HYDROLYSIS
William B. Carter, Ponca City, Okla., assignor to Continental Oil Company, Ponca City, Okla., a corporation of Oklahoma
No Drawing. Continuation of application Ser. No. 41,757, July 11, 1960. This application Nov. 5, 1964, Ser. No. 409,287
7 Claims. (Cl. 23—143)

This is a continuation of application Serial No. 41,757, filed July 11, 1960.

This application relates to the preparation of eta alumina from aluminum alcoholates. In one aspect, it relates to an improved process for hydrolyzing aluminum alcoholates to provide hydrated alumina and alcohols.

It is known in the art to prepare various types of alumina, e.g., eta, gamma, alpha, etc., by the hydrolysis of aluminum alcoholates in either acidic or basic mediums. One of the problems encountered in the preparation of alumina, particularly eta alumina, by utilizing these methods lies in the difficulty of obtaining high yields. For example, many of the articles and patents mention aging of the hydrated alumina as a prerequisite to obtain high yields of eta alumina.

In accordance with this invention, aluminum alcoholates are hydrolyzed to provide hydrated alumina yields of substantially 100 percent, said alumina being convertible to eta alumina without aging of the hydrated alumina.

It is an object of this invention to provide an improved process for the preparation of eta alumina.

It is another object of this invention to provide an improved process for the preparation of eta alumina from aluminum alcoholates.

Still another object of this invention is to provide an improved process for hydrolyzing aluminum alcoholates to provide hydrated alumina and alcohols.

Yet another object of this invention is to provide an improved process for preparing alcohols from aluminum alcoholate.

Another object of this invention is to provide an improved process for preparing eta alumina having a very high surface area.

These and other objects of the invention will become more readily apparent from the following detailed description and discussion.

The foregoing objects are achieved broadly by a process which comprises spraying finely subdivided aluminum alcoholate onto the surface of a heated body of water, thereby forming hydrated alumina slurry and alcohols.

In one aspect of the invention, the hydrated alumina is separated from the alcohols, dried, and calcined to provide eta alumina.

In another aspect of the invention, alcohols are further recovered from the hydrated alumina slurry prior to calcination of the hydrated alumina by solvent extraction, stripping, or a combination thereof.

In carrying out the invention, aluminum alcoholate is finely subdivided and introduced to the surface of a body of water, e.g., by spraying, whereby the alcohols are released and hydrated alumina is formed. The alcoholates which are employed in carrying out the invention include broadly alkoxy aluminum compounds in which the alkoxy groups can contain from 1 to as high as 20 carbon atoms or higher. While individual alcoholates can be utilized, usually the alcoholates are mixtures of compounds in which a variety of alkyl groups are present. The invention is directed particularly to the use of alcoholates obtained by oxidation of aluminum trialkyl "growth" product. Growth product is prepared by reacting aluminum trialkyl, usually aluminum triethyl, with a low molecular weight mono-1-olefin, such as ethylene, at a temperature between about 65 and about 150° C. and a pressure from about 200 to about 5,000 p.s.i.g., whereby growth of the aluminum groups is promoted to provide aluminum trialkyls having alkyl groups containing up to 20 or more carbon atoms. This growth product is converted to alcoholate by oxidation with oxygen (air), usually at temperatures between about 20 and 50° C. and pressures between about 10 and 60 p.s.i.g., whereby the alkyl groups are converted to alcoholates. The alcoholates formed in this process have a composition following a Poisson distribution in the alkyl groups. All or any portion of the resulting alcoholates can be hydrolyzed in accordance with the method of this invention.

Specific examples of alcoholates which can be employed include compounds such as aluminum ethylate, aluminum isopropylate, aluminum butylate, aluminum hexylate, aluminum decylate, aluminum tetradecylate, aluminum octadecylate, aluminum eiscosylate, and the like.

The water into which the alcoholate is introduced is maintained above room temperature, usually above about 50° C. and preferably at a temperature between about 80 and about 100° C. While water of lower temperatures can be employed, the yield of hydrated alumina is much lower than is obtained with the heated water. In addition, it has been found that heated water is necessary to obtain a separation of alcohols and hydrate alumina slurry, which results from the hydrolysis, into two phases. This separation into two phases allows easier recovery of the different products of the hydrolysis reaction.

Any of the conventional spray or atomizing nozzles can be provided for the purpose of subdividing the aluminum alcoholate prior to its introduction to the water. Subdivision of the aluminum alcoholate preferably is further aided by employing an atomizing gas which can be any inert gas, such as nitrogen, carbon dioxide, steam, air, etc. The degree of subdivision of the aluminum alcoholate can vary over a relatively wide range; however very fine droplets produce the best results. The source of aluminum alcoholate spray can be positioned at various distances from the water but, as a practical matter, is usually positioned between about 15 and about 24 inches from the water surface.

When the aluminum alcoholate is sprayed on the surface of the water, the surface water is quickly used up in the reaction; and only a partial degree of hydrolysis is obtained. If agitation of the water is provided, however, it is found that the hydrolysis will continue and eventually go to completion. When agitation is provided, it should be relatively mild, since excessive agitation results in the formation of emulsion of the alcohols and alumina product, which can introduce additional separation problems. It is possible, however, to vary the degree of agitation over a relatively wide range to provide the results desired and at the same time avoid the emulsion problem.

As noted previously, the use of heated water provides separation of the hydrolysis products into two phases. One phase contains the major proportion of the alcohols intermixed with dissolved water. If desired, this phase, after separation, can be further treated to recover the alcohols from the water and further separate individual alcohols where necessary.

The second phase comprises hydrated alumina slurry containing usually from about 5 percent to about 12 percent hydrated alumina, about 5 percent to about 12 percent alcohols, and the remaining water. In general, the hydrated alumina is alpha-alumina mono-hydrate. Preferably, the hydrated alumina slurry, after separation from the alcohol phase, for example, by decantation, is further processed to recover alcohols therefrom. This additional separation can be effected by leaching, for example, utilizing a suitable solvent, such as ethyl ether, methanol, butanol, acetone, etc. In another method, recovery of the alcohols from the hydrated alumina slurry can be effected by stripping the slurry with an inert stripping medium, such as, steam, nitrogen, etc. Still further, the separation can be effected by a combination of solvent extraction and stripping, if desired.

The hydrated alumina slurry is further processed to effect the separation of water, for example, by filtering followed by drying at a temperature above the boiling point of water. The hydrated alumina is then subjected to calcination which is ordinarily carried out in a temperature range of about 600 and 1200° F. The calcination step can be carried out for extended periods, for example, from about 0.5 hour to as high as 24 hours or higher.

The eta alumina which results from the calcination treatment has a very high surface area, between about 280 and about 380 square meters per gram, and can be used in various treating and conversion processes wherein absorbents and conversion catalysts are conventionally employed. For example, as a catalyst, the eta alumina can be used either alone or in combination with other catalytic materials for carrying out hydrocracking, hydroforming, desulfurization, and similar catalytic operations.

It has been found in comparison to other processes for hydrolysis of aluminum alcoholates that aging of the hydrated alumina is not necessary and does not substantially effect the yield of eta alumina. It has also been found that the method of the present invention provides very high yields of hydrated alumina and ultimately eta alumina.

The following examples are presented in illustration of the invention:

EXAMPLE 1

*Effect of mixing aluminum alcoholate with water by dropwise addition of the former*

200 ml. of water were placed in a 500 ml. beaker. Aluminum alcoholate with an alcohol distribution corresponding to a Poisson M [1] value of 4 was added dropwise from a separatory funnel. It was qualitatively visually evident that the desired products, hydrated alumina, and alcohols were not formed. Instead of gelatinous mass consisting of partially hydrolyzed material floated on the surface of the water. Rapid (>500 r.p.m.) stirring was tried in an attempt to break up this material and further hydrolysis. This was successful.

The experiment was repeated using hot water (160° F.). Visually, there was a very small amount of alcohol produced.

EXAMPLE 2

*Effect of adding water to aluminum alcoholate*

200 grams of aluminum alcoholate were placed in a 3-necked flask with a bottom take-off. The flask was fitted with a thermometer, stirrer, and water condenser; and a heating mantle was placed around the flask. The aluminum alcoholate was heated to 80° C.; 100 cc. of water were added. Slow stirring (<200 r.p.m.) was ineffective in mixing the water with the aluminum alcoholate; thus the mixture was stirred vigorously for 30 minutes. Upon standing, two layers formed. The organic phase was decanted. The aqueous phase was centrifuged; the water was discarded; and the remaining solids were analyzed for alumina, water, and organic content.

Results:

16.8% volatile at 110° C. (includes water, ethanol, and butanol)

48.4% $Al_2O_3$ determined by calcination at 1,100° F. This corresponds to 57.0% $AlO_3 \cdot H_2O$ 24.9% organic material extracted with pentane after 2 hours' reflux in HCl The final figure indicates that one fourth of the aluminum alcoholate material was unhydrolyzed in water. The experiment was repeated with the idea that longer reaction time would produce higher yields; however, after an hour the reactants products became highly emulsified, and no analysis was possible.

EXAMPLE 3

*Reaction of aluminum alcoholate with water by spraying aluminum alcoholate from a hollow cone nozzle*

Aluminum alcoholate was fed by means of a metering pump through a preheater, a filter, and finally through a hollow cone nozzle where it was sprayed beneath the surface of water. The rate was approximately 40 cc. per minute, and experiments were performed with both hot and cold water in an 800 ml. beaker. Hydrolysis of the hot (200° F.) aluminum alcoholate in the cold water was visually very incomplete, with most of the alumnium alcoholate rising unreacted to the surface of the water. The run with hot water showed little difference. However, when the water-aluminum alcoholate mixture was stirred vigorously, it appeared that hydrolysis was accuring to some extent before emulsification problems again arose.

EXAMPLE 4

*Dilution of the aluminum alcoholate with xylene*

The aluminum alcoholate was mixed 1:1 volumetrically with xylene. The mixture was then hydrolyzed as in Example 3 using hot water. Again visual examination showed that much unreacted alcoholate remained in the water.

EXAMPLE 5

Aluminum alcoholate was pumped through a copper line using a metering pump at a rate of 40 cc. per minute. A microfilter was inserted in the line to prevent any large particles of foreign material from clogging the nozzle. Provisions were also made to heat the aluminum alcoholate using Nichrome heating wire wrapped around the copper tubing. The pneumatic gas which was used to break the aluminum alcoholate into a fine spray was $CO_2$. The nozzle was a pneumatic nozzle manufactured by Spraying Systems Company. It is listed in that company's catalogue as Spraying Systems pneumatic nozzle set-up No. 12. The nozzle was maintained several inches above the surface of the water which was stirred in an 800 ml. beaker at a rate of approximately 150 r.p.m. Sufficient alcoholate was sprayed into 300 ml. of water to yield a 10 percent hydrated alumina slurry (the aluminum alcoholate with a Poisson M value of 4 on the alcohol distribution contains 6 percent aluminum). Hot water (90° C.) was used to obtain maximum yield (100 percent hydrated alumina) and to split the alcohols and hydrated alumina into two phases. The alcohols were then decanted, and the remaining alumina slurry was dried and calcined. Calcination was performed at 1,100° F. for one hour. X-ray analysis indicated that the product formed was eta alumina. The hydrated form was analyzed similarly and found to be alpha-alumina monohydrate.

EXAMPLE 6

Conditions for hydrolysis were identical with that of Example 5 except that the stirring speed was greater than 500 r.p.m. This condition formed an emulsion

---

[1] The product of the growth reaction follows a statistical distribution known as the Poisson distribution. Mathematically, this may be expressed as follows:

$$(\text{Moles})_n \alpha f(n) = \frac{e^{-m} m^n}{n!}$$

where:

$(\text{Moles})_n$ = number of moles having $n$ additions of ethylene
$n$ = number of additions of ethylene to an Al—C—C group
$m$ = mean number of additions of ethylene that was exceedingly difficut to break. Although hydrolysis may be complete, separation of the alcohols from the alumina is extremely difficult.

EXAMPLE 7

Conditions for hydrolysis were identical with that of Example 5. However the hydrated alumina was aged in situ for periods up to 72 hours. These aging periods were respectively 0, 1, 5, 11½, 24, and 72 hours at 100° C. Each of these samples was subdivided and calcined for periods of ½, 1½, and 4 hours at 1,110° F. Each of the samples was then X-rayed to determine the type of alumina and qualitatively to determine the degree of crystallinity. All of the alumina monohydrate samples were alpha-alumina monohydrate. The samples definitely become more crystalline as the age increased. The calcined samples were eta alumina. There was no marked difference in the degree of crystallinity of the calcined sample as a function of alumina monohydrate age. The effect of age of calcination was not readily apparent in that there appeared to be little difference in the crystallinity of the calcined samples.

The surface area of the various calcined samples was measured, with the results being presented in Table I:

TABLE I

| Calcination Age, Hour | Surface Area, Square Meters/Gram | | |
|---|---|---|---|
| | ½ | 1½ | 4 |
| Alumina Monohydrate Age, Hour: | | | |
| 0 | 376 | 329 | 319 |
| 1 | 371 | 366 | 345 |
| 5 | | | |
| 11½ | | | |
| 24 | 319 | 343 | |
| 72 | 284 | 279 | 279 |

It is apparent from Table I that the process of this invention provides eta alumina having very high surface areas, that is, between about 280 and about 380 square meters per gram.

The formation of eta alumina as a function of alumina monohydrate in accordance with the method of this invention is in disagreement with the prior art. The prior art patents usually recommend at least two hours of aging and preferably more than 20 in order to obtain eta alumina with the desired characteristics.

EXAMPLE 8

Conditions for hydrolysis were identical with that of Example 5 except that $N_2$ instead of $CO_2$ was used as the pneumatic gas. No difference was noted in the resultant hydrolysis.

Having thus described the invention by providing specific examples thereof, it is to be understood that no undue limitations or restrictions are to be drawn by reason thereof and that many variations and modifications are within the scope of the invention.

What is claimed is:
1. A process for the preparation of eta alumina which comprises atomizing aluminum alcoholate with an inert atomizing gas, introducing said atomized aluminum alcoholate to the surface of an agitated body of heated water maintained at a temperature above about 50° C., thereby forming hydrated alumina and alcohols, separating hydrated alumina from said alcohols, drying, and calcining said dried hydrate at a temperature between about 600 and 1200° F. to provide eta alumina.

2. A process for the preparation of eta alumina which comprises atomizing aluminum alcoholate with steam, introducing said atomized aluminum alcoholate to the surface of an agitated body of heated water maintained at a temperature above about 50° C., thereby forming hydrated alumina and alcohols, separating hydrated alumina from said alcohols, drying, and calcining said dried hydrate at a temperature between about 600 and 1200° F. to provide eta alumina.

3. A process for the preparation of eta alumina which comprises atomizing with an inert atomizing gas an aluminum alcoholate prepared by reacting aluminum triethyl with ethylene at a temperature between about 65 and about 150° C. and a pressure between about 200 and about 5000 p.s.i.g. and oxidizing the reaction product with the air at a temperature between 20 and 50° C. and a pressure between about 10 and about 60 p.s.i.g., introducing said atomized aluminum alcoholate to the surface of an agitated body of water, said water being maintained at a temperature between about 80 and about 100° C., thereby forming hydrated alumina and alcohols, separating hydrated alumina from said alcohols, drying, and calcining said dried hydrate at a temperature between about 600 and 1200° F. to provide eta alumina.

4. A process in accordance with claim 3 wherein said inert atomizing gas is steam.

5. A process in accordance with claim 3 wherein said inert atomizing gas is nitrogen.

6. A process in accordance with claim 3 wherein said inert atomizing gas is air.

7. A process in accordance with claim 3 wherein said inert atomizing gas is carbon dioxide.

References Cited by the Examiner
UNITED STATES PATENTS

| | | | |
|---|---|---|---|
| 1,451,399 | 4/1923 | Low | 23—182 X |
| 2,776,188 | 1/1957 | Gilbert | 23—143 |
| 2,805,920 | 9/1957 | Richardson | 23—143 |
| 2,827,458 | 3/1958 | Mirviss et al. | |
| 2,889,268 | 6/1959 | Dinwiddie et al. | 23—143 X |
| 2,917,365 | 12/1959 | Gilbert | 23—143 |

FOREIGN PATENTS 760,081  10/1956  Great Britain.

OSCAR R. VERTIZ, *Primary Examiner.*

MAURICE A. BRINDISI, *Examiner.*

H. T. CARTER, *Assistant Examiner.*